Figure 1:
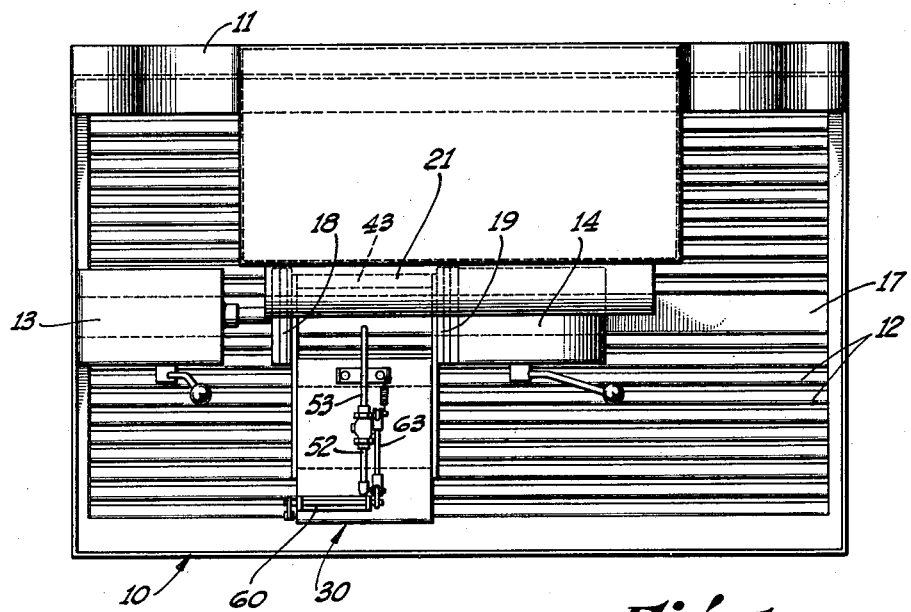

Aug. 10, 1948.   R. L. FITCH   2,446,873
MAGNETIC INSPECTION APPARATUS
Filed Nov. 29, 1943   3 Sheets-Sheet 1

INVENTOR.
RAYMOND L. FITCH,
BY
ATTORNEY.

INVENTOR.
RAYMOND L. FITCH,
BY
ATTORNEY.

Aug. 10, 1948.  R. L. FITCH  2,446,873
MAGNETIC INSPECTION APPARATUS
Filed Nov. 29, 1943  3 Sheets-Sheet 3

INVENTOR.
RAYMOND L. FITCH,
BY
ATTORNEY.

Patented Aug. 10, 1948

2,446,873

UNITED STATES PATENT OFFICE 2,446,873

MAGNETIC INSPECTION APPARATUS

Raymond L. Fitch, Pacific Palisades, Calif.

Application November 29, 1943, Serial No. 512,152

7 Claims. (Cl. 175—183)

1

My invention relates generally to the art of magnetic inspection, and more particularly to auxiliary apparatus for use with magnetic inspection machines, such for example, as the ones shown in my prior Patent No. 2,277,431, and my copending application, Serial No. 493,568, now Patent No. 2,430,167, issued November 4, 1947.

As is well known in the art, magnetic inspection of a part which is clamped between a pair of electrodes and magnetized by passage of a current therethrough will indicate longitudinal flaws or inclusions in the part. However, in inspecting magnetizable materials where flaws are probable in a plane not parallel to the major axis, or where the part to be inspected does not possess a well defined major axis, it is customary to use a longitudinal or "bi-polar" coil wherein the parts are placed so that a magnetic flux field is established approximately at right angle to the magnetic field that would be established by placing the part between electrodes.

The major object of this invention is to provide an improved magnetizing coil for these purposes.

A further object of my invention is the provision of a magnetizing or "bi-polar" coil which is substantially automatic in its operation so as to largely eliminate the possibility of error in spraying the workpiece with the inspection medium and the magnetization of the piece immediately following the spraying step.

It is also an object of my invention to provide a longitudinal magnetizing coil in which the fluid discharge apparatus is associated directly with the coil thereby eliminating the necessity of having an auxiliary hose or other means for flooding the work piece.

Another object of my invention is to provide a magnetizing or "bi-polar" coil which can be easily installed in magnetic inspection machines of various types and which can just as easily be removed therefrom when the inspection operations have been completed. In this connection, it will be seen that the coil of my invention is adapted to be connected directly to the regular contact plates of the machine by the simple expedient of clamping the contactors therebetween.

One of the principal advantages of my invention resides in the fact that it insures uniform treatment of the parts being inspected and makes possible an improved method of handling and inspecting small articles which have heretofore caused considerable trouble when inspected by previously known methods and apparatus.

Another advantage of my apparatus is that

2 it can, if desired, be operated from the same controls that are employed in the operation of the inspection machine with which the magnetizing coil is being used, thus eliminating the necessity of providing duplicate controls, and simplifying the operation in general.

Figure 2:
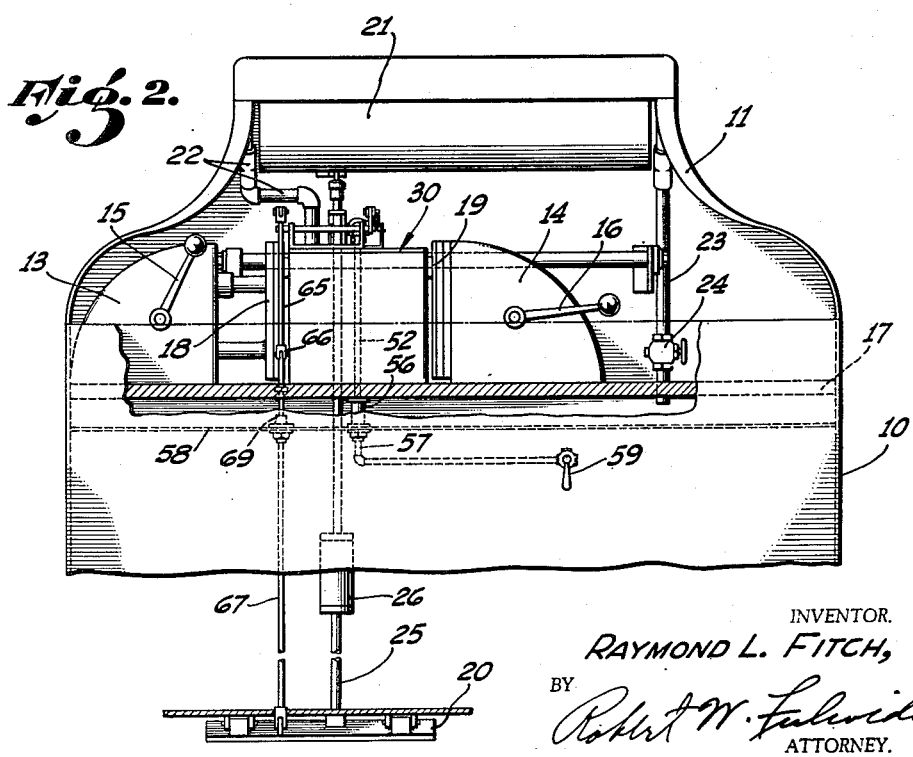
Figure 3:
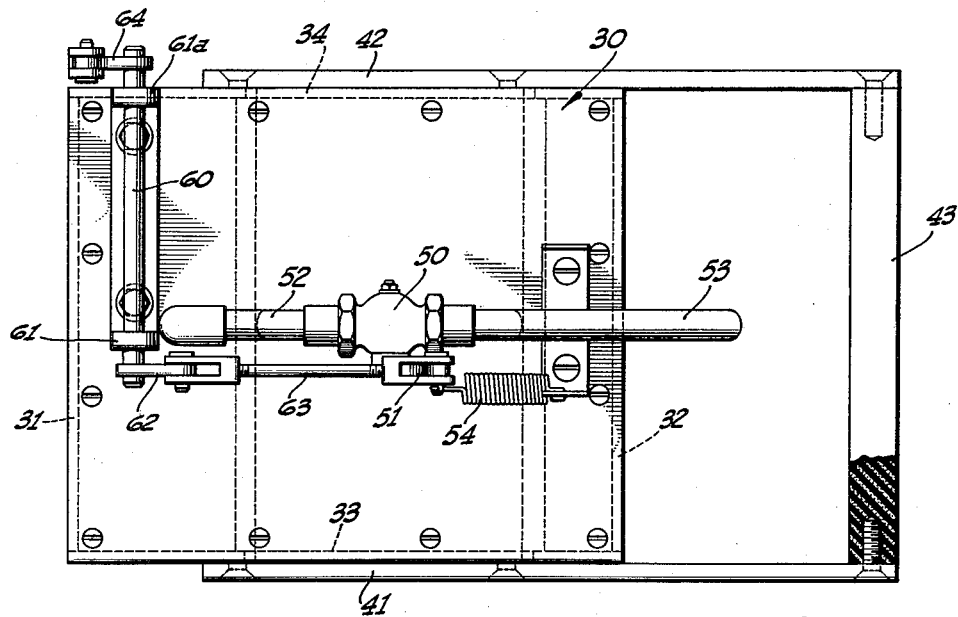
Figure 4:
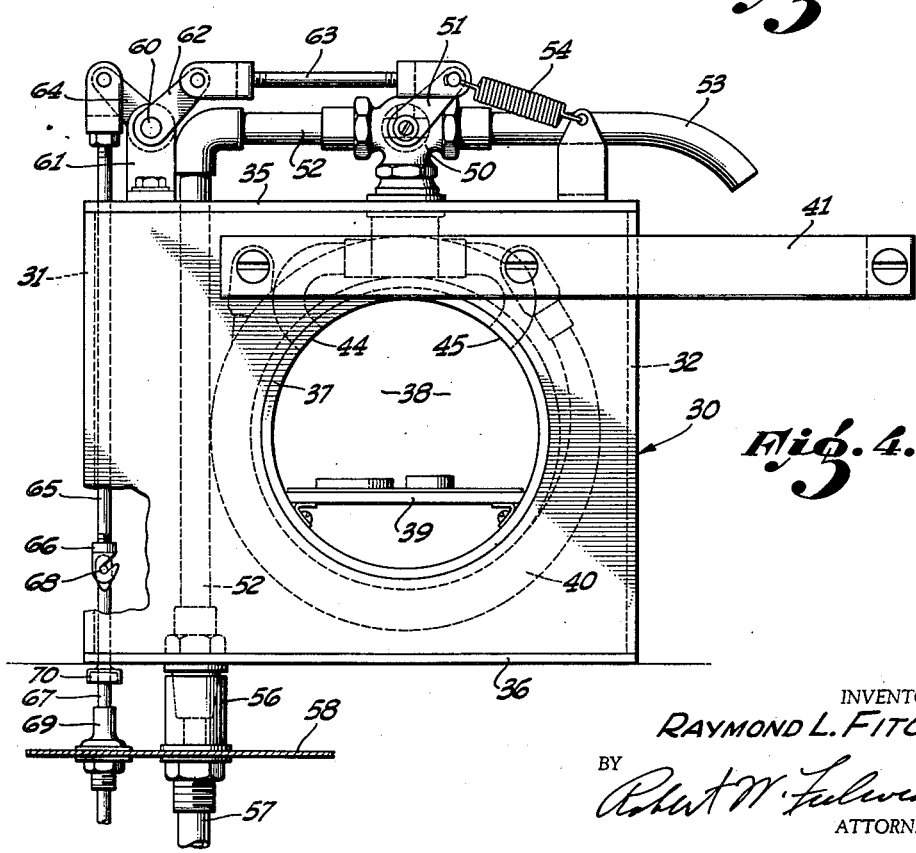
Figure 5:
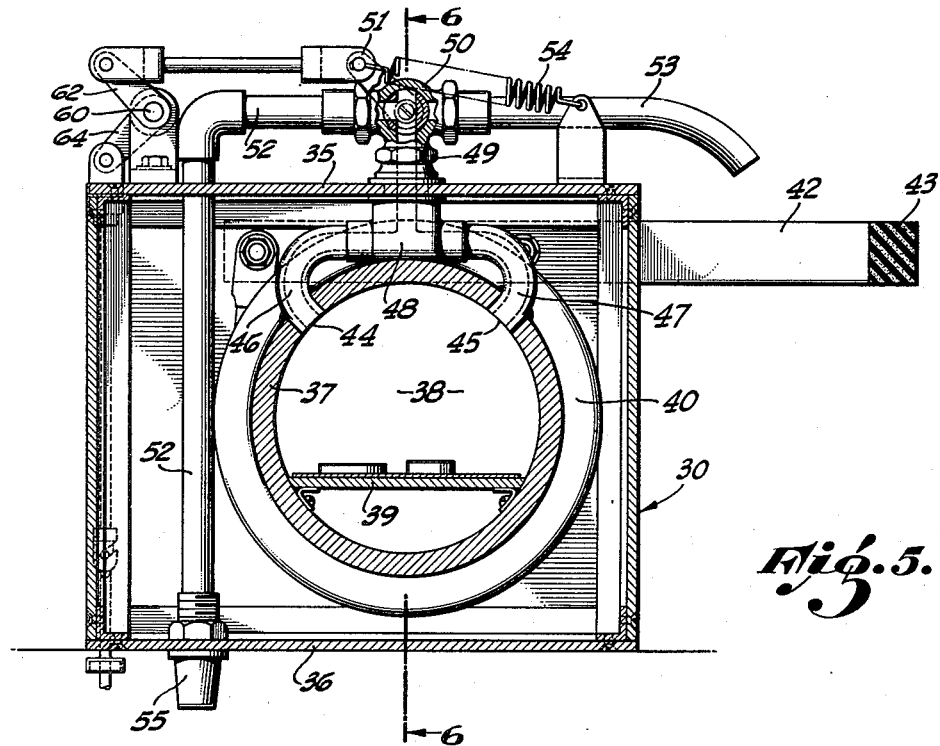
Figure 6:
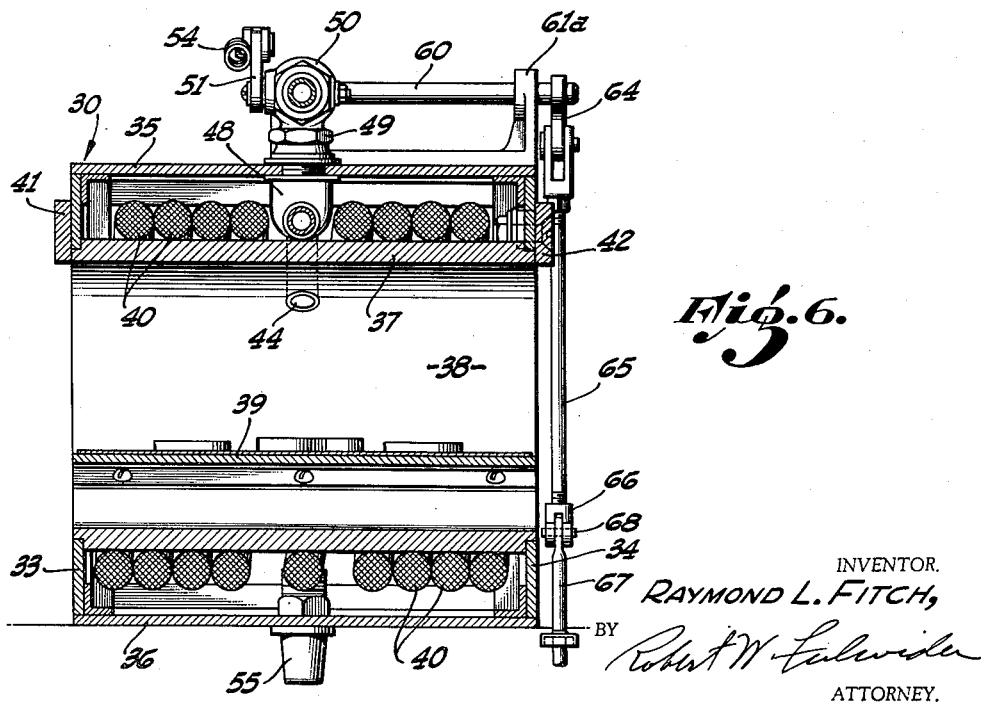

These and other objects and advantages of my invention will become apparent from the following description of a preferred form thereof, and from the accompanying drawings in which:

Fig. 1 is a top plan view showing one form of longitudinal magnetizing coil made according to my invention, installed for operation on the deck of a magnetic inspection machine of the type shown in my copending application, Serial No. 493,568, Fig. 2 is a front elevational view, partially broken away, of the apparatus shown in Fig. 1, Fig. 3 is an enlarged top plan view of the magnetizing coil itself, Fig. 4 is an end elevational view of the coil shown in Fig. 3, Fig. 5 is a vertical cross-section corresponding to Fig. 4 but showing the valving mechanism in its other position, and Fig. 6 is a vertical cross-section taken on the line 6—6 of Fig. 5.

As previously mentioned, the longitudinal magnetizing coil of my invention is normally used with magnetic inspection apparatus of the type which includes a pair of electrical contact plates adapted to hold the work being inspected, means for flooding the work with a suitable paramagnetic inspection medium such as iron oxide particles in suspension in kerosene or other vehicle, and means for passing a heavy magnetizing current through the work after it has been flooded. While the magnetizing coil of my invention can be used with various types of magnetic inspection apparatus, I have chosen for illustrative purposes herein the machine shown in my copending application Serial No. 493,568, of which parts are seen in Figs. 1 and 2 hereof. Referring to these figures, the numeral 10 indicates the main cabinet of the machine which is provided with an upstanding back wall 11 and a latticework deck 12. A spring-loaded headstock 13 and a freely movable tailstock 14, provided with operating levers 15 and 16 respectively, are slidably movable on a centrally disposed guide rail 17 which may be located substantially flush with the deck 12 as indicated in Fig. 2. The headstock 13 is provided with an electrical contact plate 18 and the tailstock 14 is provided with a similar contact plate 19, between which elongated work pieces may be clamped for magnetic inspection, the contact plates 18 and 19 being respectively connected through suitable switch means to a source of magnetizing current.

In the form of magnetic inspection apparatus illustrated in Figs. 1 and 2, I initiate the action of the switch means by the use of a foot treadle 20 which is operated by the inspector at will. Means, preferably in the form of a movable baffle plate 21, is provided to flood the work piece with inspection medium carried thereto by the piping 22 leading from a circulating pump (not shown) disposed in the lower portion of the machine. An outlet pipe 23 and a control valve 24 control the rate of flow of the fluid to the baffle plate 21 which is connected to the foot treadle 20 so as to be swung into position to flood the work piece as desired. However, when using the magnetizing coil of my invention, the baffle plate is disconnected, since the coil apparatus is provided with its own flooding means.

The switch means is preferably of the delayed action type such as illustrated in my said copending application and is correlated with the spraying means and the treadle 20 in such manner that when the treadle 20 is moved downwardly, the work is flooded with inspection fluid, and after the lapse of a predetermined time the flooding is stopped and the work is magnetized by the passage of current therethrough for a predetermined time, the switch means being adjusted to open the magnetizing circuit without further action on the the part of the operator. As set forth in detail in my said copending application, a push rod 25 connects the treadle 20 to both the baffle 21 and the switch means (not shown), so that when the push rod 25 is raised by action of the operator, the baffle plate 21 is swung into position to flood the work piece, and as the push rod 25 descends against the action of a dash pot or other delaying means indicated generally in Fig. 2 by the numeral 26, the flow of inspection medium is cut off, and the magnetizing switch is closed. Further downward movement of the push rod 25 opens the switch and restores the machine to normal condition. While as stated, I prefer to use automatic mechanism of this type, it will be apparent that for the operation of the magnetizing coil now to be described, any suitable delayed action switching means may be employed in combination with suitable control means for the flooding mechanism or if desired the flooding and magnetizing may be controlled manually and separately.

The magnetizing coil of this invention is indicated generally by the numeral 30, and includes a box-like housing having front and rear walls 31 and 32, side walls 33 and 34, a top 35, and a base 36. The side walls 33 and 34 are each provided with a relatively large circular opening in which a cylindrical tube or shell 37 is mounted and extends through the box from one side to the other, providing a chamber 38 open at each end. A suitable platform 39 which may be in the form of a removable shelf is supported in the lower portion of the chamber 38 and is preferably formed of screen or other perforated material to allow the inspection fluid to flow therethrough. The housing and shell are preferably formed of dielectric material. A coil 40 of relatively heavy copper wire is wound around the shell 37 with one end connected to a rearwardly extending bus bar 41 carried by side wall 33, and its other end connected to a rearwardly extending bus bar 42 carried by side wall 34. The rearwardly extending ends of the bus bars 41 and 42 are connected and held apart by a cross-piece 43 of dielectric material to permit lateral pressure to be exerted upon the rear ends of the bus bars. The preferred method of using the magnetizing coil is to place it on the deck of the inspection machine as illustrated in Figs. 1 and 2 and then to clamp the bus bars 41 and 42 between the tailstock and headstock as indicated. This provides a simple and efficient method of connecting the coil 40 in the magnetizing circuit already provided for the inspection machine.

The upper portion of the shell 37 is provided with a pair of fluid discharge ports 44 and 45 which are connected by ducts 46 and 47, respective to a T connection 48 which extends upwardly through the housing top 35, terminating in a fitting 49. The ports 44 and 45 are disposed so as to completely spray articles resting on the tray 39 when the valving mechanism now to be described is operated to cause a flow of inspection medium through the ducts 46 and 47.

The fitting 49 connects to one opening of a by-pass valve 50, preferably of the three-way type, provided with an operating arm 51 and having its other two openings connected to an inlet pipe 52 and an outlet pipe 53. The valve 50 is so arranged that when the operating arm 51 is in its right-hand position as shown in Fig. 3, fluid from the inlet pipe 52 passes through the valve to the overflow or by-pass pipe 53, but when the arm 51 is moved to its left-hand position shown in Fig. 5, the fluid from inlet pipe 52 passes down through the fitting 49, T 48, and ducts 46 and 47 into the chamber 38 to flood the work pieces on the tray 39.

Resilient means such as coil spring 54 is provided to normally hold the valve arm 51 in its right-hand position to by-pass the inspection medium through the outlet pipe 53. Inlet pipe 52 passes downwardly through the casing and terminates in a tapered bushing 55 adapted to seat in, and form a relatively fluid-tight connection with a complemental tapered bushing 56 carried on the upper end of a pipe 57 leading from the circulation pump of the inspection machine. The pipe 57 with its bushing 56 may be supported in position by a horizontal bracket plate 58 carried by the forward wall of the inspection machine, and a manualy operated control valve 59 may be disposed on the forward wall of the machine in position for easy operation. As seen best in Fig. 2, the magnetizing coil housing preferably rests on the deck 12, the bushings 55 and 56 being so disposed that they will fit snugly when the coil is in operating position.

I prefer to operate the valve arm 51 by means of a linkage connected to the foot treadle 20 of the inspection machine, and for this purpose, I provide a horizontal shaft 60 rotatably mounted in brackets 61 and 61a secured to the top 35 of the coil housing. The shaft 60 carries crank arms 62 and 64 on its opposite ends, the crank 62 being connected to the valve arm 51 by means of a pivoted link 63, and the crank 64 being pivotally connected to a vertical rod 65 which carries a bifurcated hook 66 on its lower end. A vertically movable rod 67 provided with a cross-pin 68 on its upper end adapted to engage the hook 66 is slidably mounted in a sleeve 69 secured to the bracket plate 58 and has its lower end connected to the forward portion of foot treadle 20. It will be apparent, therefore, that when the foot treadle 20 is depressed, rods 67 and 66 will rock the cranks 62 and 64 counter-clockwise to pull the valve arm 51 from the right-hand position shown in Fig. 3 to the left-hand position shown in Fig. 5, thus shifting the passages within the valve 50 and causing magnetic inspection fluid to flow through the ports 44 and 45 into the chamber 38. When the treadle 20 returns to its normal rest position, the spring 54 will return the valve 50 to its normal condition in which the fluid by-passes through the outlet pipe 53, and down through the deck 12 into a sump in the machine.

The operation of my device in connection with an inspection machine of the type described is as follows: Assuming that several small articles are to be inspected, they are placed on the tray 39 which is slid into the chamber 38 surrounded by the coil 40. The valve 59 is opened to connect the inlet pipe 52 with the circulating system of the machine, and the foot treadle 20 is pressed down. This moves the valve arm 51 by means of the linkage previously described to cause inspection medium to discharge from the ports 44 and 45 to flood the articles being inspected. As the foot treadle moves up toward its normal position, the valve 50 is moved back to its normal by-pass position, and immediately thereafter, the delayed action switching mechanism operated by the push rod 25 closes the electric circuit of the machine causing current to flow through the coil 40 by reason of its connection to the contact plates 18 and 19 through bus bars 41 and 42. The switch remains closed just long enough to magnetize the parts being inspected, and further downward travel of push rod 25 opens the switch so that the tray 39 can be removed and the articles inspected for discontinuities evidenced by the pattern of the iron oxide particles which adhere to the work pieces. This operation can of course be repeated as many times as desired, and when the series of operations is completed, the magnetizing coil can be easily removed by loosening tailstock 14 to release bus bars 41 and 42, thus permitting the housing to be lifted from the deck 12 after disconnecting the hooks 66 and 68. It will be noted that the rod 67 carries a small cup 70 attached thereto to prevent it from sliding down through the sleeve 69 when the hook is disconnected.

It is thus seen that I have provided a simple and efficient magnetizing coil which can be used separately or with conventional magnetic inspection machines, but it is to be understood that while the form of my invention shown and described in detail herein is now deemed to be my preferred form, it is merely illustrative of the broad scope of my invention as defined in the appended claims.

I claim:

1. Apparatus for use in the magnetic inspection of materials, which includes: a housing having a shell therein provided with a pair of apertures in its upper portion; a coil of electrical conducting material surrounding said shell and within said housing; a pair of ducts in said housing having outlet ends terminating in said shell apertures for discharging inspection fluid into said shell said ducts being angularly disposed so that their streams impinge; a fluid supply line connected to said ducts and provided with a valve; means normally holding said valve in closed position with respect to said ducts; means for operating said valve adapted to connect with prime mover means under the control of the operator; and connectors carried by said housing and adapted to connect said coil to a source of electric current.

2. Apparatus for use in the magnetic inspection of materials which includes: a housing having a shell therein, provided with apertures in its upper portion; a coil of electrical conducting material surrounding said shell and within said housing; means for supporting an article to be inspected within the chamber formed by said shell and above the floor thereof; ducts mounted in said housing having outlet ends terminating in said shell apertures and angularly disposed so that their streams impinge for discharging inspection fluid over said article while in said position; a fluid supply line connected to said ducts and provided with a valve; means normally holding said valve in closed position with respect to said ducts; means for operating said valve including a crank and a pair of links, one of said links having connecting means on its free end adapted to connect with prime mover means under the control of the operator; and a pair of bus bars mounted on said housing and extending therefrom in spaced parallel relationship, said bus bars having their inner ends connected to the respective ends of said coil, whereby they can be clamped between the headstock and the tailstock of a magnetic inspection machine.

3. Apparatus for use in the magnetic inspection of materials which includes: a housing having a chamber therein and a coil surrounding said chamber the axis of said coil being horizontal; means for supporting the article to be inspected within said chamber; means mounted within said housing for discharging inspection fluid into said chamber and onto said supporting member; a fluid supply line provided with a valve mounted on said housing and adapted to connect said discharge means to a source of inspection fluid; link means adapted to connect said valve with delayed action treadle means, whereby said valve can be opened and closed by the action of said treadle means; and means for connecting said coil into an electric circuit controlled by switch means operated by said treadle means to close said circuit after said valve is closed.

4. A longitudinal magnetizing coil for use in combination with, a magnetic inspection machine having a deck, a headstock and a tailstock adapted to clamp articles therebetween, a fluid circulating system for discharging inspection fluid on to an article so clamped, an electric circuit connected to said head and tailstocks, a source of electric energy connectable in said circuit delayed action switching means for energizing said circuit after discharge of said fluid has ceased, and means for operating said switch means, which includes: a housing adapted to be disposed on the deck of said inspection machine and provided with a cylindrical shell therein disposed with its axis horizontal; a coil of electrical conducting material surrounding said shell between the shell and said housing; duct means mounted between said housing and said shell extending through the upper portion of said shell and adapted to discharge fluid over articles disposed in said shell; means adapted to connect said duct means to the fluid circulating system of said machine, said means including a by-pass valve normally held in by-pass position; mechanism adapted to be connected to said delayed switch operating means and to said valve to operate the latter pursuant to operation of the former; and connectors mounted on said housing adapted to connect said coil to the contact plates of said head and tailstock, respectively.

5. A longitudinal magnetizing coil for use in combination with, a magnetic inspection machine having a deck, a headstock and a tailstock adapted to clamp articles therebetween, a fluid circulating system for discharging inspection fluid on to an article so clamped, an electric circuit including a source of electric energy connected to said head and tailstocks, and switching means for energizing said circuit after discharge of fluid has ceased, means for operating said switching means, which includes means adapted to be disposed on the deck of said inspection machine providing a shell having its axis horizontal; a coil of electrical conducting material surrounding said shell; duct means mounted adjacent said shell and extending through the upper portion of said shell and adapted to discharge fluid over articles disposed in said shell; means including a valve adapted to connect said duct means to the fluid circulating system of said machine; mechanism adapted to connect said operating means and said valve to operate the latter pursuant to operation of the former; and connectors extending from said coil adapted to connect said coil to the contact plates of said head and tailstock, respectively.

6. Apparatus for use in the magnetic inspection of materials which includes: a housing having a chamber therein and a coil surrounding said chamber; means for supporting an article to be inspected within said chamber; means mounted within said housing for discharging inspection fluid into said chamber and onto said supporting member; a fluid supply line provided with a valve mounted on said housing and adapted to connect said discharge means to a source of inspection fluid; link means adapted to connect said valve with treadle means whereby said valve can be opened and closed by the action of said treadle means; and means for connecting said coil into an electric circuit controlled by switch means operated by said treadle means to close said circuit after said valve is closed.

7. Apparatus for use in the magnetic inspection of materials which includes: a housing having a shell therein provided with apertures in its upper portion; a coil of electrical conducting material surrounding said shell and within said housing; means for supporting an article to be inspected within the chamber formed by said shell and above the floor thereof; ducts mounted in said housing having their outlet ends terminating in said shell apertures and angularly disposed so that their streams impinge for discharging inspection fluid over said article while in said position; a fluid supply line connected to said ducts and provided with a valve; means normally holding said valve in closed position with respect to said ducts; means for operating said valve in response to movement of a prime mover under the control of the operator; and bus bars mounted on said housing adapted to be connected between the headstock and the tailstock of a magnetic inspection machine.

RAYMOND L. FITCH.

REFERENCES CITED

The following references are of record in the file of this patent:

UNITED STATES PATENTS

| Number | Name | Date |
|---|---|---|
| 733,788 | Woods | July 14, 1903 |
| 2,216,600 | Moore | Oct. 1, 1940 |
| 2,217,733 | De Forest | Oct. 15, 1940 |
| 2,257,736 | Ferrier | Oct. 7, 1941 |
| 2,277,431 | Fitch | Mar. 24, 1942 |
| 2,334,827 | Lyons, Jr. | Nov. 23, 1943 |